(12) United States Patent
Treichler et al.

(10) Patent No.: US 8,495,327 B2
(45) Date of Patent: Jul. 23, 2013

(54) MEMORY DEVICE SYNCHRONIZATION

(75) Inventors: Sean Jeffrey Treichler, Sunnyvale, CA (US); Barry Alan Wagner, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 248 days.

(21) Appl. No.: 12/794,592

(22) Filed: Jun. 4, 2010

(65) Prior Publication Data

US 2011/0302385 A1 Dec. 8, 2011

(51) Int. Cl.
*G06F 12/00* (2006.01)
*G06F 13/00* (2006.01)
*G06F 13/28* (2006.01)
*G06F 1/04* (2006.01)
*G06F 1/12* (2006.01)
*G06F 5/06* (2006.01)
*G11C 7/00* (2006.01)

(52) U.S. Cl.
USPC .............................. 711/167; 713/601; 365/194

(58) Field of Classification Search
USPC .............................. 711/167; 713/601; 365/194
See application file for complete search history.

(56) References Cited

U.S. PATENT DOCUMENTS

| | | | |
|---|---|---|---|
| 5,218,684 A | 6/1993 | Hayes et al. | |
| 5,319,755 A | 6/1994 | Farmwald et al. | |
| 6,292,903 B1 * | 9/2001 | Coteus et al. | 713/401 |
| 6,470,405 B2 | 10/2002 | Barth et al. | |
| 7,177,998 B2 | 2/2007 | Ware et al. | |
| 7,287,119 B2 | 10/2007 | Barth et al. | |
| 2001/0043505 A1 * | 11/2001 | Lee et al. | 365/233 |
| 2005/0193183 A1 * | 9/2005 | Barth et al. | 711/170 |
| 2007/0091710 A1 * | 4/2007 | Oh | 365/233 |
| 2010/0277993 A1 * | 11/2010 | Foley et al. | 365/194 |

OTHER PUBLICATIONS

JEDEC Standard / DDR3 SDRAM Standard / JESD79-3D (Revision of JESD79-3C, Nov. 2008), Sep. 2009, JEDEC Solid State Technology Association, 220 pages.

1Gb gDDR3 SDRAM E-die / 96 FBGA with Lead-Free & Halogen-Free (RoHS Compliant), Samsung Electronics, Rev. 1.2 Jul. 2009, 123 pages.

Natsuki Kushiyama et al., A 500-Megabyte/s Data-Rate 4.5M DRAM, IEEE Journal of Solid-State Circuits, vol. 28, No. 4, Apr. 1993, 0018-9200/93$03.00, 1993 IEEE, pp. 490-498.

Shigeo Ohshima et al., "High Speed DRAMs with Innovative Architectures", IEICE Trans. Electron, vol. E77-C, No. 8, Aug. 1994, pp. 1303-1315.

* cited by examiner

*Primary Examiner* — Ryan Bertram

(74) *Attorney, Agent, or Firm* — Richard E. Billion; Jamieson W. Fish; Billion & Armitage

(57) ABSTRACT

A memory controller includes first and second output modules for driving first and second data, respectively, to be written to a memory device. The memory controller also includes a clock module for providing an internal clock signal and a timing control module for producing a first and second timing control signals. The first and second timing control signals are supplied to the first and second output modules, respectively.

22 Claims, 3 Drawing Sheets

MEMORY DEVICE SYNCHRONIZATION

BACKGROUND

Memory systems are used in a variety of applications, such as computer systems, telecommunications, and control systems. Dynamic random access memory (DRAM) is a common type of memory used in such systems. DRAM is often synchronous (SDRAM), in that one or more of the memory's inputs or outputs are synchronized with an external clock. This allows for very tight control of the information being transferred by providing and receiving the information based on setup and hold times relative to the clock.

One type of memory is the Double Data Rate (DDR) SDRAM. Conventional DDR SDRAMs (e.g., DDR-3) utilize an external clock signal as well as multiple data strobe signals for synchronization. In a memory write operation, a controller provides one or more data strobe signals along with the data to be written to the DDR SDRAM so that the SDRAM can sample the data synchronously with respect to the data strobe signal. It is desired to provide improvements to this conventional type of memory. Such improvements may include reduced number of signals, reduced pin count, faster operation, improved consistency, and so forth.

Propagation delays are also prevalent in conventional memory systems. Given the high rate of operation, the time it takes for a signal to propagate from one location to another can have very important effects on the timing of a memory transfer. It is desired to provide improvements to better account for propagation delays.

Other external variables must also be considered for conventional memory systems. For example, variations in processing (e.g., fabrication) characteristics, voltage, and temperature can have very important effects on the timing of a memory transfer. It is desired to provide improvements to better account for external variables.

What is needed is a memory controller, memory device, memory system, and method for operation in a memory system that provide one or more of the above-listed improvements.

SUMMARY

The present disclosure provides many different embodiments of memory controllers, memory devices, memory systems, and methods of operation therein.

According to one embodiment, the disclosure describes a memory controller that includes first and second output modules for driving first and second data, respectively, to be written to a memory device. The first and second data may be, for example, 8-bit bytes of data. The memory controller also includes a clock module for providing an internal clock signal. In some embodiments, the internal clock signal is derived from an externally-provided clock signal. The memory controller further includes a timing control module for producing first and second timing control signals that are supplied to the first and second output modules, respectively.

The first and second output modules drive the first and second data, respectively, at different times responsive to the internal clock signal and the first and second timing control signals. The different times can be functions of several different items, such as an internal propagation delays of the memory device, variations in process parameters, voltage, and/or temperature of the memory device or the controller, and/or a an identification (e.g., part number or manufacturer) of the memory device.

According to one embodiment, the disclosure describes a method for controlling one or more memory devices connected to a controller via a data bus. The method includes receiving a clock signal and producing a plurality of delay values that correspond to different groups of data lines of the data bus. The method also includes separately driving data on the different groups of data lines on the data bus responsive to the clock signal and responsive to the delay values. Data on at least two of the groups of data lines are driven at different times.

The delay values for driving data can be responsive to multiple items, including variations in process parameters, variations in operating temperature, and variations in operating voltage of the memory devices. The delay values can also be responsive to a manufacture of at least one of the memory devices.

According to one embodiment, the present disclosure also describes a memory system including a controller, a memory device, a data bus, and an external clock. The controller includes first and second output modules for driving first and second data, respectively, to be written to the memory device, and a timing control module. The memory device includes first and second input modules for receiving the first and second data, respectively, from the controller. The data bus is connected between the controller and the memory device for transferring the first and second data. The external clock signal is provided to the controller and the memory device. The controller's timing control module is configured to produce first and second delay values so that the first and second data are driven at different times based on the external clock signal and the first and second delay values. The first and second input modules of the memory device receive the first and second data at different times, responsive to an internal clock signal derived from the external clock signal.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DESCRIPTION OF THE EMBODIMENTS

The present invention provides a novel memory system, a novel memory controller, and a novel memory, as well as novel methods of operating the same. For the sake of example, the following description will describe various embodiments of the present invention. Some embodiments will achieve features and advantages that other embodiments do not, and no feature or advantage is considered to be critical to the invention, except as specifically described in the claims.

It is understood that several components or steps may be only briefly described, such being well known to those of ordinary skill in the art. Also, additional components or steps can be added, and certain of the following can be removed and/or changed while still implementing the claimed invention. For example, an intermediate component can be placed between two disclosed components in a manner known to those of ordinary skill in the art. Thus, the following description should be understood to represent examples only, and is not intended to suggest that one or more steps are required.

Figure 1:
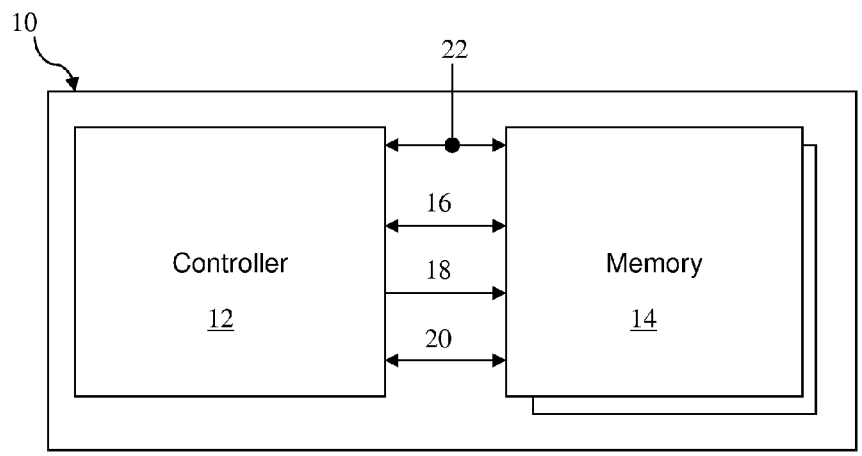
FIG. 1 is a block diagram of a memory system in which one or more embodiments of the present invention may be implemented. The memory system includes a controller and one or more memories.

Referring now to FIG. 1, the reference numeral 10 refers to a memory system in which one or more embodiments of the present invention may be implemented. The memory system 10 includes a controller 12 and one or more memories 14 connected by a plurality of bus lines, including a control bus 16, an address bus 18, a data bus 20, and an external clock 22. Examples of a memory system include a graphics card with a graphics controller and associated memory (e.g., SDRAM); an external memory drive with a memory controller and associated memory (e.g., flash memory); and a computer system with a processor and associated memory (e.g., static RAM). It is understood that many different separate integrated circuits can be used to implement the controller, the memory, and/or the overall memory system, or the entire memory system can be placed on a single chip. For the sake of example, the following disclosure will discuss a single-chip controller 12 for controlling two single-chip SDRAMs 14. Also for the sake of example, the data bus 20 is 32 bits wide, with 16 bits going to one of the SDRAMs 14, and the other 16 bits going to the other SDRAM. Although not required, in the present embodiment, the two SDRAMs are identical, and will be generically referred to as SDRAM 14.

Figure 2:
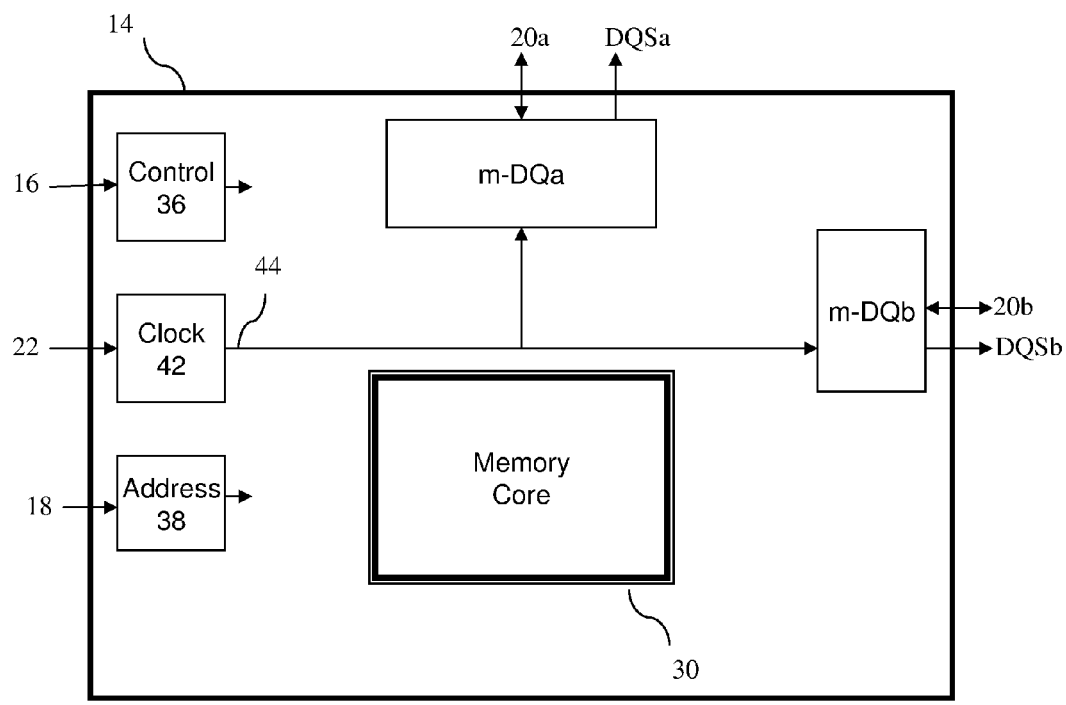
FIG. 2 is a block diagram of a memory from FIG. 1. For the sake of example, the memory is illustrated as an SDRAM.

Referring to FIG. 2, continuing with the example above, the SDRAM 14 includes a memory core 30 that includes a plurality of DRAM memory cells. These cells can be arranged in various formations, including a multi-bank configuration, in which one or more of the addresses on the address bus 18 will be bank selection lines. Continuing with the present example, the SDRAM 14 is a DDR3 SDRAM, and except as described below, operates according to the JEDEC Standard JESD79-3D, September 2009, which is hereby incorporated by reference.

The SDRAM 14 includes a plurality of interface modules, including a control module 36 that connects to the control bus 16; an address module 38 that connects to the address bus 18; a clock module 42 that connects to the external clock 22; and a plurality of data input/output (I/O) modules m-DQa, m-DQb, m-DQc, and m-DQd. In the present discussion, a module is a group of circuitry that may be co-located or distributed across the memory, and some circuitry may be shared across multiple modules. In the present example, the control module 36 includes a plurality of registers for synchronously receiving and storing control information sent from an external source (e.g., the controller 12). Additional storage may also be provided for storing such information as a memory identification code which can identify a manufacturer and/or a part number for the SDRAM. Also in the present example, the address module 38 is a synchronous module and includes registers for receiving and storing a row address and a column address. Further in the present example, the clock module 42 produces an internal clock signal 44 for the SDRAM 14. It is understood that some memories may have an internal clock generator, may receive multiple clock signals and/or have phase-lock or delay-lock loop circuitry to modify the clock signal(s).

Also continuing with the present example of 16 bit SDRAMs, the data bus 20 will include four sub-portions, two of which will go to each SDRAM. For the SDRAM 14, each sub-portion 20a, 20b is 8 bits wide, and each will connect to corresponding 8 bit I/O modules m-DQa, m-DQb, respectively. Also in the present embodiment, each of the I/O modules m-DQa, m-DQb includes a corresponding strobe signal DQSa, DQSb, respectively. The strobe signals DQSa, DQSb are driven by the SDRAM 14 during a memory read operation and are provided to the memory controller 12, as indicated in the above-referenced memory datasheet. The strobe signals DQSa, DQSb are not used during a memory write operation, as discussed below. The I/O modules are further discussed below with reference to FIG. 5b.

The other 16 bit SDRAM shown in FIG. 1 is similar to the SDRAM shown in FIG. 2, but includes I/O modules m-DQc, m-DQd and strobe signal DQSc, DQSd, respectively for the other two sub-portions 20c, 20d, respectively, of the data bus 20.

In the present embodiment, the line for the internal clock signal 44 connects to both I/O modules in the corresponding SDRAM 14. Due to the different lengths of the signal path, the clock signal on the line may be different (e.g., due to different propagation delays) at different I/O modules. In alternative embodiments, there may be more than one internal clock signal line, and there may be more than one external clock 22 and/or clock module 42 for a single SDRAM.

Figure 3:
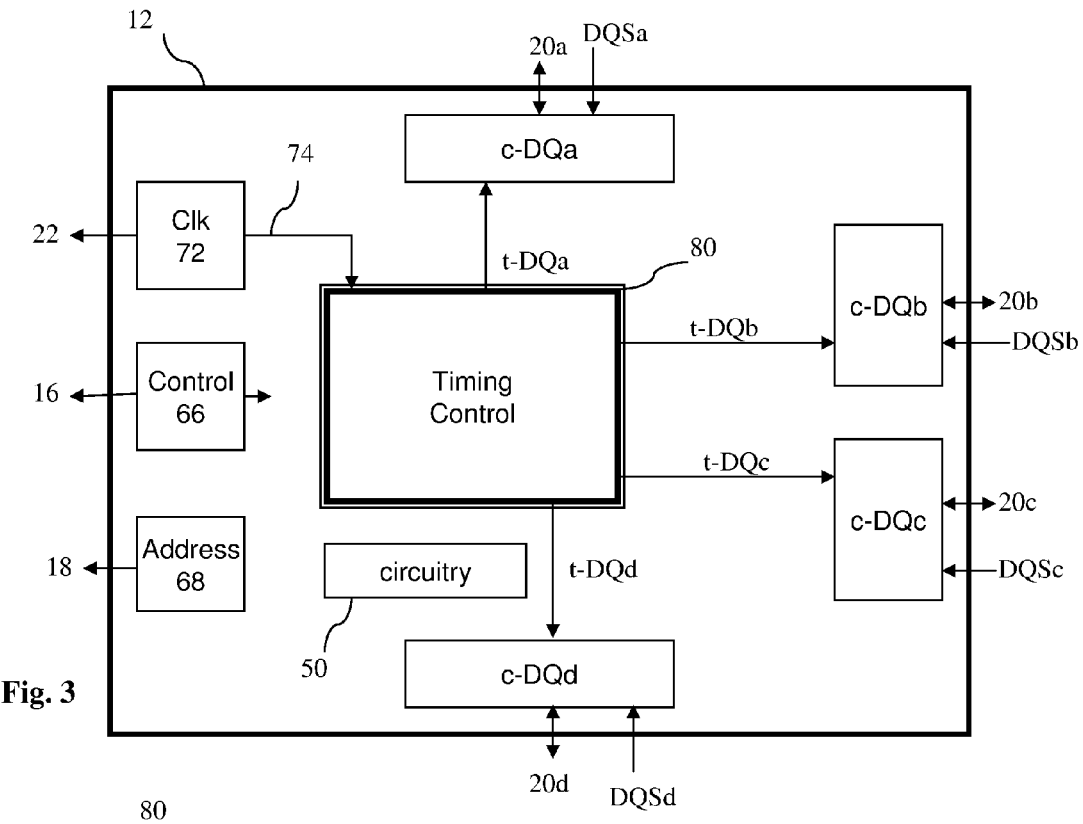
FIG. 3 is a block diagram of a controller from FIG. 1.

Referring to FIG. 3 and continuing with the example above, the controller 12 includes conventional processing circuitry, generally designated by the box 50. Conventional processing circuitry, including a processing unit and a memory for storing executable instructions, is provided to perform various functionality, well known by those of ordinary skill in the art.

The controller 12 includes a plurality of interface modules, including a control module 66 that connects to the control bus 16; an address module 68 that connects to the address bus 18; a clock module 72 that connects to the external clock 22 and produces an internal clock signal 74; and a plurality of data input/output (I/O) modules. In the present embodiment, the clock module 72 also drives the external clock signal 22 to the SDRAMs 14. In some embodiments, multiple external clocks can be provided, and the clock module 72 may include delay or phase lock loop circuitry.

As discussed above, in the present example, the data bus 20 is a 32 bit bus. Accordingly, there can be various numbers of I/O modules. The present example of the controller 12 will include four I/O modules, c-DQa, c-DQb, c-DQc, and c-DQd that correspond to the two SDRAMs 14 shown in FIG. 1. It is understood that the controller 12 may include a different number of modules. For example, it may include two 16 bit modules or sixteen 2 bit modules.

Also in the present embodiment, each of the I/O modules c-DQa, c-DQb, c-DQc, and c-DQd includes a corresponding strobe signal DQSa, DQSb, DQSc, and DQSd, respectively. As mentioned above, in the present example, the strobe signals DQSa-DQSd are driven by the two SDRAMs 14 during a memory read operation and are provided to the memory controller 12, as indicated in the above-referenced JEDEC Standard. The strobe signals DQSa-DQSd are not used during a memory write operation, as discussed below. The I/O modules are further discussed below with reference to FIG. 5a.

The controller 12 also includes a timing control module 80. The timing control module 80 receives the internal clock signal 74 derived from the external clock signal 22, and provides a plurality of timing signals for the plurality of I/O modules. In the present figure, there are four I/O modules:

c-DQa, c-DQb, c-DQc, and c-DQd. Correspondingly, the timing control module 80 produces four timing control signals: t-DQa, t-DQb, t-DQc, and t-DQd, respectively. While the four timing control signals t-DQa, t-DQb, t-DQc, and t-DQd are all a function of the internal clock signal 74, some or all of the signals may be different from each other.

For the sake of quick reference and further example, the following table maps the various I/O modules and corresponding signal and data lines:

| I/O module (memory) | I/O module (controller) | Timing Signal (controller) | Strobe Signal (memory) | Data lines | DQs |
|---|---|---|---|---|---|
| m-DQa | c-DQa | t-DQa | DQSa | 20a | DQ0-7 |
| m-DQb | c-DQb | t-DQb | DQSb | 20b | DQ8-15 |
| m-DQc | c-DQc | t-DQc | DQSc | 20c | DQ16-23 |
| m-DQd | c-DQd | t-DQd | DQSd | 20d | DQ24-31 |

Figure 4:
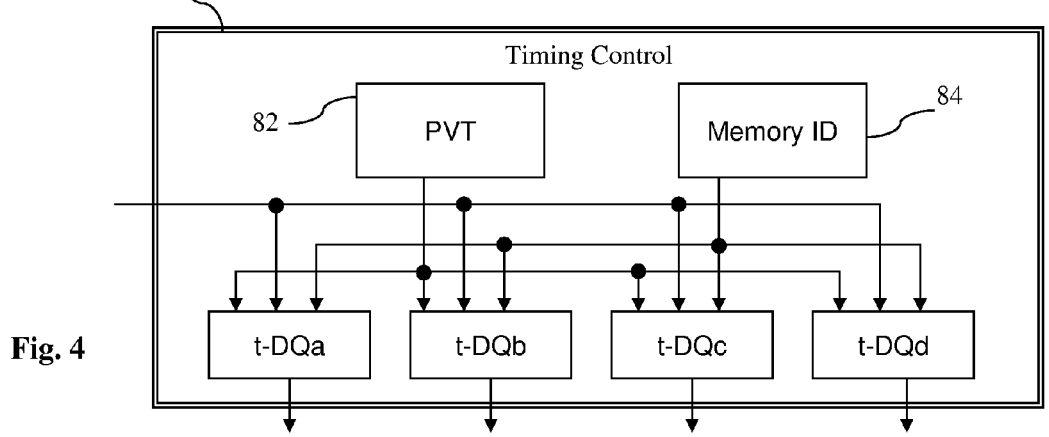
FIG. 4 is a block diagram of a timing control module from the controller of FIG. 3.

Referring to FIG. 4, the timing control module 80 includes a processing-voltage-temperature (PVT) module 82 and a memory identification (ID) module 84. The PVT module 82 is a compensation circuit that adjusts the four timing control signals t-DQa, t-DQb, t-DQc, and t-DQd to account for PVT delays of the internal clock signal 44 that occur in the memory 14. Variations in processing characteristics includes variations in fabrication parameters used in creating the memory 14. Variations in voltage include variations in the operating voltage of the controller 12 or memory 14, and/or variations in the bus voltages. Variations in temperature include variations in operating temperatures of the system 10, controller 12, and/or memory 14. In one embodiment, the PVT module 82 may provide a fixed delay (e.g., 750 picoseconds) to account for PVT delay. In another embodiment, the PVT accesses external settings that provide the delay. For example, these external settings can sense temperature and/or voltage in response to which the PVT module 82 can adjust the delay. In yet another embodiment, internal BIOS in the processing module 50 provides the delay values.

The memory ID module 84 is also a compensation circuit that adjusts the four timing control signals to account for design-specific delays of the memory 14. In one embodiment, the memory ID module 84 is fixed at the time of manufacturing the controller 12. In another embodiment, the memory ID module 84 queries the memory 14 (e.g., a mode register) to learn a manufacturer-code that identifies a manufacturer and/or a part number. The manufacture code can identify specific delays for the four timing control signals t-DQa, t-DQb, t-DQc, and t-DQd. In yet another embodiment, the memory ID module 84 accesses internal BIOS in the processing module 50 to adjust the delay. Additional and/or alternative mechanisms can also be used to adjust the delay. For example, dynamic training can be implemented with the memory 14 by adjusting the delay value and finding the best fit that returns valid data. In this example, a known data value can be written to memory and then read back. If the data is correct, the delay is a suitable delay.

Figure 5A:
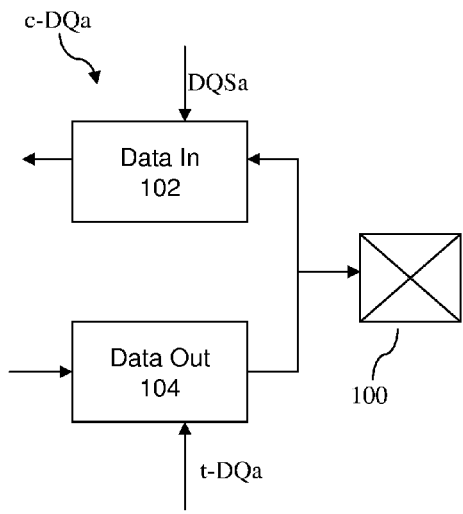
FIG. 5a is a block diagram of an input-output data module from the controller of FIG. 3.

Referring to FIG. 5a, an I/O module for the controller 12 is represented by a single-bit sub-module for the I/O module c-DQa. An I/O pad 100 connects to a data-in circuit 102 and a data-out circuit 104. The data-in circuit 102 is a synchronous circuit and includes one or more registers or latches that are controlled by the strobe signal DQSa received from the memory 14. The data-out circuit 104 is also a synchronous circuit and includes one or more registers or latches that are controlled by the timing signal t-DQa received from the timing control module 80 of the controller 12.

Figure 5B:
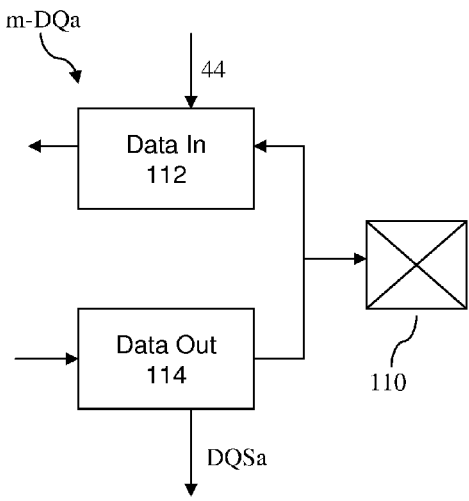
FIG. 5b is a block diagram of an input-output data module from the memory of FIG. 2.

Referring to FIG. 5b, an I/O module for the memory 14 is represented by a single-bit sub-module for the I/O module m-DQa. An I/O pad 110 connects to a data-in circuit 112 and a data-out circuit 114. The data-in circuit 112 is a synchronous circuit and includes one or more registers or latches that are controlled by the internal clock signal 44. The data-out circuit 114 is also a synchronous circuit and includes one or more registers or latches that are controlled by the internally created strobe signal DQSa. The I/O module m-DQa provides the strobe signal DQSa to the controller 12.

Figure 6:
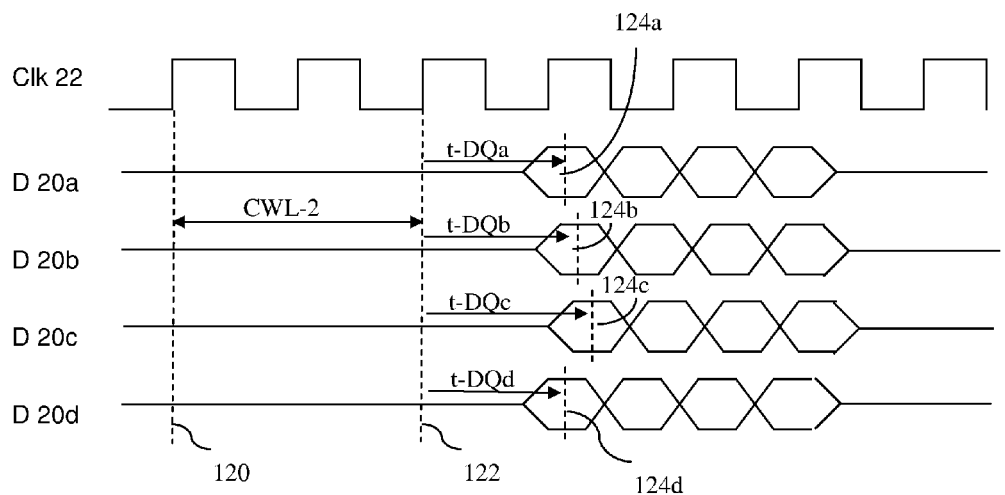
FIG. 6 is a timing diagram of a write operation according to one or more embodiments of the present invention.

FIG. 6 illustrates a write operation from the perspective of the memory 14. The example SDRAM described above will be continued. In the present example, there is a CAS write latency (CWL) value of 2 clock cycles between when the CAS signal is received by the SDRAM 14 (time 120) and when the write data D is to be sampled (with reference to time 122). In addition, the write operation is illustrated as a burst write of four.

The timing control signals t-DQa adds a delay to the setup and hold time for the I/O module m-DQa so that it samples write data D at time 124a. Likewise, timing control signals t-DQb, t-DQc, and t-DQd add delays to the setup and hold time for the I/O modules m-DQb, m-DQc, and mDQd, respectively, so that they sample write data D at times 124b, 124c, and 124d, respectively. It is understood that some of the various timing control signals may be equal to each other, and some may be set to zero.

Features of several embodiments have been outline above. Those skilled in the art will appreciate that they may readily use the present disclosure as a basis for designing or modifying other processes and structures for carrying out the same purposes and/or achieving the same advantages as the embodiments introduced above. For example, the above disclosure describes common I/Os, where write data D and read data Q are received from a common input. Other examples can use separate I/Os. Also, the above disclosure describes a non-multiplexed bus for connecting to the various devices, but a multiplexed bus, or a packetized bus can also be used. Those skilled in the art will also realize that such equivalent constructions do not depart from the spirit and scope of the present disclosure, and that they may make various changes, substitutions and alterations to the disclosed embodiments without departing from the spirit and scope of the present disclosure.

We claim:

1. A memory controller comprising:
    first and second output modules for driving first and second data, respectively, to be written to a memory device;
    a clock module for providing an internal clock signal, wherein the clock module receives an external clock signal that is also provided to the memory device; and
    a timing control module for producing first and second timing control signals that are supplied to the first and second output modules, respectively;
    wherein the first and second output modules drive the first and second data at different times responsive to the internal clock signal and the first and second timing control signals, respectively;
    wherein the timing control module includes:
        a first module for adjusting the first and second timing control signals, which control the first and second output modules for a write operation, based on a first value for accommodating variations in process parameters, voltage, and/or temperature of the memory device, wherein the first value is provided to the first module by internal BIOS of the memory controller.

2. The memory controller of claim 1 wherein the first and second timing control signals are set to accommodate a delay in the external clock signals in propagating to corresponding data input modules on the memory device that receive the first and second data.

3. The memory controller of claim 1 wherein the timing control module includes:
a second module for adjusting the first and second timing control signals based on a second value that corresponds to an identification of the memory device.

4. The memory controller of claim 3 further comprising:
a controller module with instructions for receiving the identification from an external source.

5. The memory controller of claim 4 wherein the external source is the memory device.

6. The memory controller of claim 3 wherein the second value is retrieved from an internal memory of the controller.

7. The memory controller of claim 1 wherein the first and second output modules, the clock module, and the timing control module are all located on a single substrate.

8. The memory controller of claim 1 wherein the first delay value is set to accommodate variations in process parameters of the memory device.

9. The memory controller of claim 1 wherein the first delay value is set to accommodate variations in operating temperature of the memory device.

10. The memory controller of claim 1 wherein the first delay value is set to accommodate variations in operating voltage of the memory device.

11. A method for controlling one or more memory devices connected to a controller via a data bus, comprising:
receiving an external clock signal at the one or more memory devices and the controller;
producing, using parameters from the one or more memory devices, a plurality of delay values that correspond to different groups of data lines of the data bus, wherein at least two of the delay values are different,
accessing internal BIOS of the controller to adjust the delay values; and
separately driving data for a write operation on the different groups of data lines on the data bus responsive to the clock signal and responsive to the delay values, wherein data on at least two of the groups of data lines are driven at different times for writing the data.

12. The method of claim 11 wherein at least two groups of data are driven to a single memory device, with the two groups of data arriving at corresponding input modules of the memory device at different times.

13. The method of claim 11 wherein the plurality of delay values are set to accommodate variations in process parameters of the memory device.

14. The method of claim 11 wherein the plurality of delay values are set to accommodate variations in operating temperature of the memory devices.

15. The method of claim 11 wherein the plurality of delay values are set to accommodate variations in operating voltage of the memory devices.

16. The method of claim 11 wherein the plurality of delay values are set to accommodate variations in voltage of the data lines.

17. The method of claim 11 wherein the plurality of delay values are responsive to a manufacture of at least one of the memory devices.

18. The method of claim 11 wherein the plurality of delay values are produced by accessing a memory of the controller.

19. A memory system comprising:
a controller with first and second output modules for driving first and second data, respectively, for a write operation and a timing control module;
a memory device with first and second input modules for receiving the first and second data, respectively, from the controller in the write operation; and
a bus connected between the controller and the memory device for transferring the first and second data;
wherein an external clock signal is provided to the controller and the memory device;
wherein the controller's timing control module is configured to produce first and second delay values, in the write operation, based on operation of the memory device so that the first and second data are driven at different times based on the external clock signal and the first and second delay values, and wherein the timing control module is configured to access internal BIOS of the controller to adjust the first and second delay values; and
wherein the first and second input modules of the memory device receive the first and second data responsive to a clock signal derived from the external clock signal and generated internally by the memory device.

20. The system of claim 19, wherein the controller's timing control module accommodates for variations in process parameters, voltage, and/or temperature of the memory device to produce the first and second delay values.

21. The system of claim 19, wherein the controller's timing control module accommodates for variations in voltage of the memory device.

22. The system of claim 19, wherein the controller's timing control module accommodates for variations in temperature of the memory device.

* * * * *